United States Patent
Krug et al.

(10) Patent No.: US 7,047,342 B2
(45) Date of Patent: May 16, 2006

(54) DATA PROCESSING STRUCTURE

(75) Inventors: Andreas Krug, Bad Mergentheim (DE); Thomas Kalker, Igersheim (DE)

(73) Assignee: Wittenstein AG, Igersheim (DE)

( * ) Notice: Subject to any disclaimer, the term of this patent is extended or adjusted under 35 U.S.C. 154(b) by 237 days.

(21) Appl. No.: 10/478,554

(22) PCT Filed: Feb. 25, 2002

(86) PCT No.: PCT/EP02/01937

§ 371 (c)(1),
(2), (4) Date: Nov. 20, 2003

(87) PCT Pub. No.: WO02/097641

PCT Pub. Date: Dec. 5, 2002

(65) Prior Publication Data

US 2004/0139263 A1   Jul. 15, 2004

(30) Foreign Application Priority Data

May 31, 2001 (DE) ................................ 101 26 749

(51) Int. Cl.
*G06F 13/14* (2006.01)
*G06F 13/00* (2006.01)

(52) U.S. Cl. ..................................... 710/305; 710/316
(58) Field of Classification Search ................. 710/108
See application file for complete search history.

(56) References Cited

U.S. PATENT DOCUMENTS

| | | | | |
|---|---|---|---|---|
| 5,566,320 A | * | 10/1996 | Hubert | 711/147 |
| 5,590,284 A | * | 12/1996 | Crosetto | 712/29 |
| 6,397,286 B1 | * | 5/2002 | Chatenever et al. | 710/302 |
| 6,434,712 B1 | * | 8/2002 | Urban et al. | 714/12 |
| 6,606,670 B1 | * | 8/2003 | Stoneking et al. | 710/14 |
| 6,725,320 B1 | * | 4/2004 | Barenys et al. | 710/316 |
| 6,904,457 B1 | * | 6/2005 | Goodman | 709/221 |
| 2004/0034457 A1 | * | 2/2004 | Stam et al. | 701/36 |
| 2004/0100440 A1 | * | 5/2004 | Levin et al. | 345/156 |

* cited by examiner

*Primary Examiner*—Rehana Perveen
*Assistant Examiner*—Matthew Spittle
(74) *Attorney, Agent, or Firm*—Bachman & LaPointe, P.C.

(57) ABSTRACT

A data processing structure comprising a plurality of processors ad a data bus for a data communication with a serial data structure. The plurality of processors can be respectively coupled in parallel to the data bus, and a data communication via the data bus with one of the processors, preferably a programming of the processor, is authorized for the same, but is blocked for all of the other processors.

7 Claims, 2 Drawing Sheets

DATA PROCESSING STRUCTURE

BACKGROUND OF THE INVENTION

The present invention relates to a data processing structure having a plurality of processors and a data bus for data communication with a serial data structure.

Drive systems usually comprise a drive controller with control electronics, a transmission system and a motor. In particular in complex systems there may be a plurality of such drive systems in a small space, for example in the arm of a robot with a plurality of degrees of freedom in the direction of movement.

FIG. 1 shows a drive system which is known from the prior art for robots having a plurality of drive controllers 10A, 10B, . . . etc. Each of the drive controllers $10i$ (where i=A, B, . . . etc.) has a microcontroller (or microprocessor) $20i$ which in turn controls, for example, a motor or motor and transmission system (indicated in FIG. 1 by the arrow $25i$). Each of the microcontrollers $20i$ is connected in each case in parallel with a field bus 30 via which each of the microcontrollers $20i$ can be controlled centrally by a central controller 50. For example a CAN (Control Area Network) bus system, such as is known in particular from the field of automobiles, is used for the field bus 30 here.

If the microcontrollers $20i$ are not already configured or if they are to be reconfigured individually or collectively, in each case there must be access from the outside to the respective microcontroller or microcontrollers $20i$ as configuration via the field bus 30 is not possible. The microcontroller $20i$ needs a minimum operating software in order to operate the field bus 30.

In order to avoid the microcontrollers $20i$ being accessed from the outside, and thus to reduce the expenditure on programming, each microcontroller $20i$ which is to be programmed can be accessed with a separate data bus $40i$, typically a serial data bus with point to point structure such as an RS232 interface. As a result, in each case a feeder line of a data bus $40i$ is necessary from a central programming unit 60 for each microcontroller $20i$ to be programmed, as is illustrated in FIG. 1.

Although adding the data buses $40i$ for programming the microcontrollers $20i$ can significantly reduce the expenditure on programming and the microcontrollers $20i$ can be programmed individually and flexibly, the actual increased expenditure on cabling as a result of the individual feeder lines to the data buses $40i$ proves impractical in many cases, in particular if only a small amount of space is available, as in the case of a robot arm. As the number of necessary data buses $40i$ increases in each case, the existing space reserves are very quickly used up and a selection of microcontrollers $20i$, which are each respectively equipped with a data bus $40i$ and are therefore freely programmable, has to be made in accordance with the space available.

It is an object of the present invention to provide a drive system having a plurality of drive controllers, in particular for applications in robots, in which the drive controllers are each freely programmable and which can be used even in applications where exacting requirements are made of the compactness of the system.

SUMMARY OF THE INVENTION

The foregoing object is achieved by providing a plurality of processors connected to a data bus in a parallel connection, and data communication via the data bus with one of the plurality of processors, preferably comprising programming this processor, is permitted for this processor and prohibited for all the others of the plurality of processors.

In accordance with the present invention, each of a plurality of microcontrollers is connected both by a field bus for controlling the microcontrollers and by a serial data bus for programming the microcontrollers, in each case in a parallel connection. Here, each microcontroller is assigned a control unit and a switching unit. In order to program one of the microcontrollers, its assigned control unit is actuated via the field bus so that it acts on the respective switching unit and data communication via the data bus is permitted with the respective microcontroller. All the other microcontrollers which are connected via the data bus are disconnected simultaneously from the data bus by their respective control units and switching units so that data communication is permitted exclusively with the one microcontroller to be programmed. The respective microcontroller is then programmed via the serial data bus.

Although according to the invention the serial data bus is accordingly fed in the form of a parallel connection with respect to the microcontrollers, the invention ensures, by means of the respective connection of the microcontroller to be programmed to the data bus and the simultaneous disconnection of the other microcontroller (which is not to be programmed) from the data bus, that the serial transmission of data for programming the one microcontroller can be carried out reliably and without disruption. In order to program a further microcontroller, it is correspondingly connected to the data bus and all the other microcontrollers are disconnected from the data bus.

In this way it is possible for one microcontroller after the other to be programmed easily and flexibly without the need for intervention from the outside. At the same time, the parallel connection of the data bus reduces the necessary quantity of feeder lines to a minimum so that even applications with severe restrictions in terms of space available for such routing of cables, for example applications in robots, are made possible.

By virtue of the interaction of the field bus with the microcontrollers of respectively assigned control units and switching units the invention thus permits the serial data bus to be assigned in a physically precise way to one of the microcontrollers in a serial connection for data communication with said microcontroller despite the parallel connection, and permits all the other microcontrollers to be physically disconnected from the serial data bus. In other words, the invention thus emulates a serial bus connection for a serial data structure when there is a parallel connection of the bus.

It is thus apparent that the invention is not restricted to drive systems or applications in robots but rather can be used generally wherever a plurality of processors (such as microcontrollers or microprocessors) are controlled via a field bus and data communication (for example for the purpose of programming) is to take place with the processors via a further data bus with a serial data structure. Further fields of application of the invention are thus in particular printing machines, packing machines, medical technology, semiconductor manufacture etc.

BRIEF DESCRIPTION OF THE DRAWINGS

Further advantages, features and details of the invention emerge from the following description of preferred exemplary embodiments as well as with reference to the drawings, in which.

DETAILED DESCRIPTION

Figure 1:
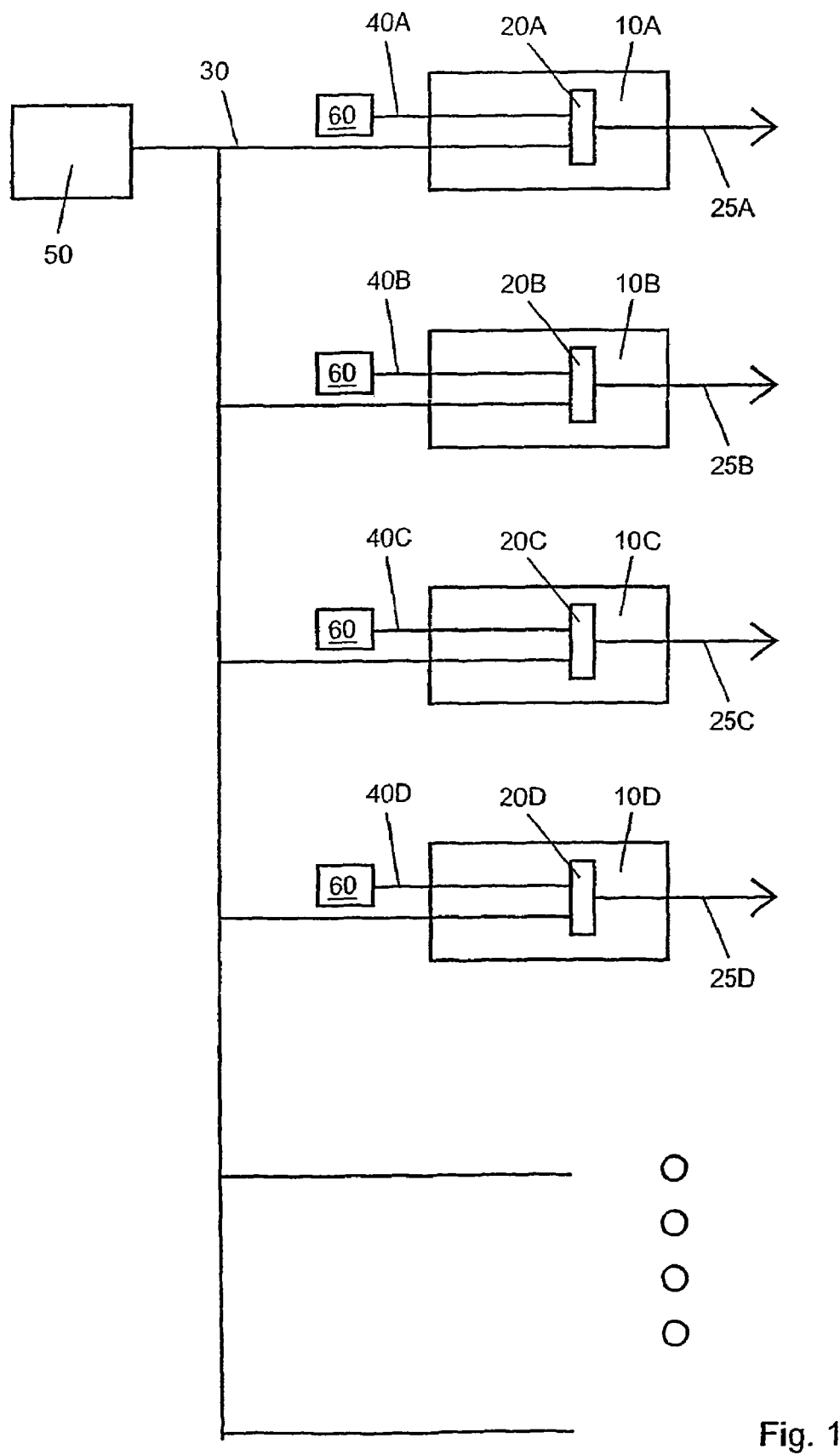
FIG. 1 shows a drive system for applications in robots which is known from the prior art.
Figure 2:
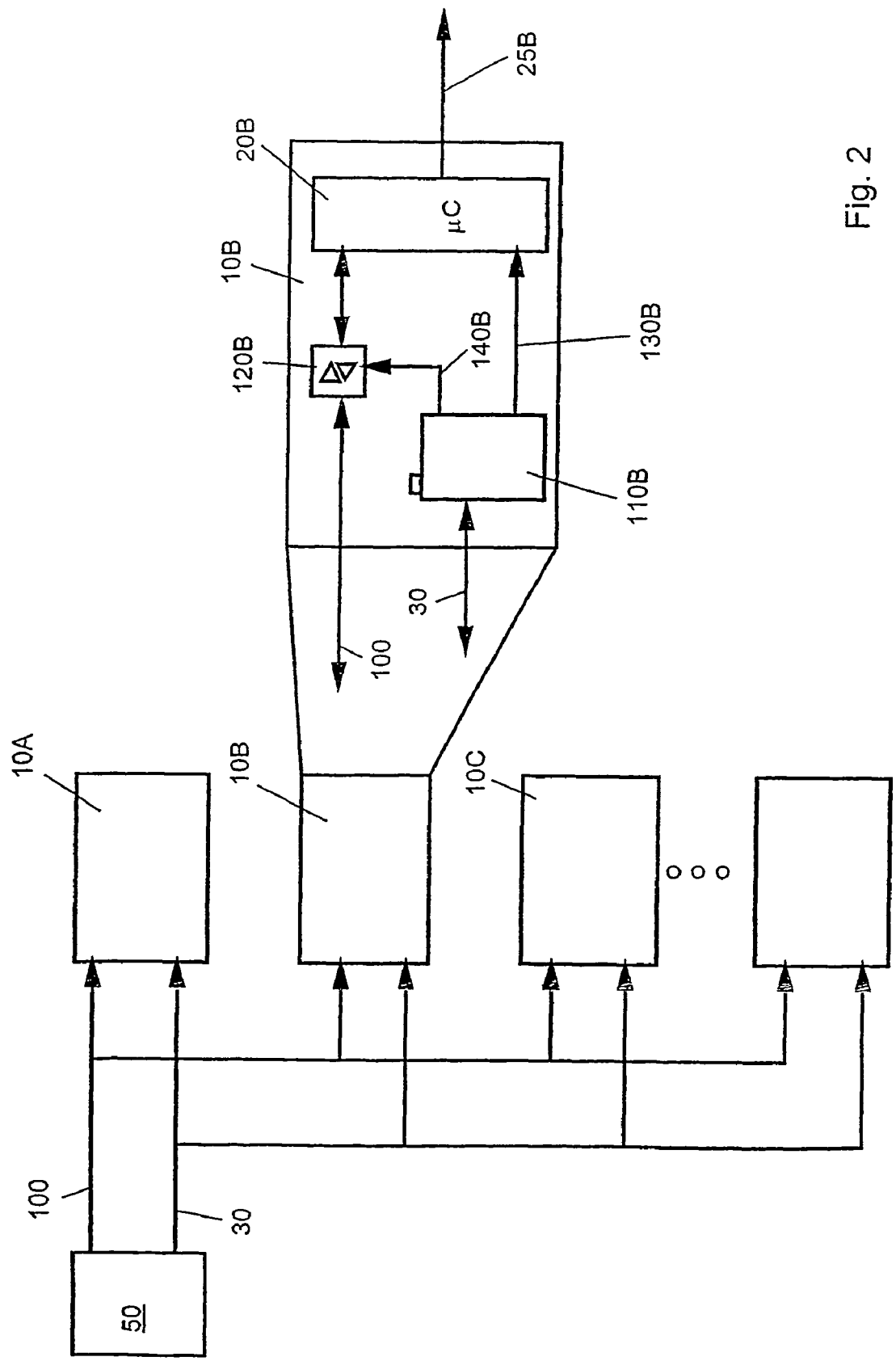
FIG. 2 shows a system according to the invention for programming a drive system, in particular for robots.

FIG. 2 illustrates, by way of example, a preferred embodiment according to the invention for the example of a drive controller, in particular for applications in robots. As is also illustrated in FIG. 1, the drive system according to FIG. 2 has a plurality of drive controllers $10i$ (where i=A, B, . . . etc.). Each of the drive controllers $10i$ is connected to the field bus 30 in a parallel connection and can be controlled centrally by the central controller 50 via said field bus 30.

In addition, each of the drive controllers $10i$ is connected, also in a parallel connection, to a data bus 100 with a serial data structure, via which data bus 100 data communication with one of the drive controllers $10i$ can be carried out. In the exemplary embodiment according to FIG. 2, the data bus 100 is connected, as is the field bus 30, to the central controller 50 which has the purpose not only of performing centralized control but also exchanging data and programming the drive controllers 10. However, it goes without saying that, instead of the central controller 50, the data bus 100 can also be connected to a separate data exchange and/or programming unit.

Since, as is apparent from FIG. 2, the field bus 30 and the data bus 100 can be constructed completely in parallel with one another, they can be combined physically and laid, for example, as a common length of cable.

As is apparent from the enlarged representation on the right-hand side in FIG. 2 with respect to the drive controller 10B, each of the drive controllers $10i$ has a microcontroller $20i$ which may be used, for example, for controlling a motor or motor and transmission system (as indicated by arrow $25i$). However, it is apparent that the design according to the invention is not restricted to drive controllers generally or to those which are used in robot technology but rather can be applied to any systems in which a plurality of microcontrollers or other corresponding programmable components can be controlled via a field bus and programmed individually by means of a data bus with a serial data structure.

In addition to the microcontroller $20i$, each of the drive controllers $10i$ has a control unit $110i$ and a switching unit $120i$. The control unit $110i$ is connected to the field bus 30 and has a control output $130i$ to the microcontroller $20i$, and a request output $140i$ to the switching unit $120i$. The switching unit $120i$ is connected on one side to the data bus 100 and on the other side to the microcontroller $20i$. The switching unit $120i$ is controlled via the request output $140i$, the microcontroller $20i$ being either connected to the data bus 100 or disconnected from it by means of the switching unit $120i$.

In a normal operating situation, the drive controllers $10i$ are controlled centrally via the field bus 30, the respective control signals being passed on from the field bus 30 via the respective control unit $110i$ to the associated microcontroller $20i$ via the control output $130i$.

In order to program the microcontroller $20i$, the associated control unit $110i$ receives via the field bus 30 a respective request signal and makes this available, or a signal derived therefrom, to the request output $140i$. By means of this request signal, the control unit $120i$ connects the microcontroller $20i$ to the data bus 100 so that data communication can take place between the central controller 50 and the microcontroller $20i$ via the data bus 100.

At the same time as the request signal for the control unit $110i$ is emitted, the other control units $110j$ (where j=A, B, . . . etc., but j≠i) receive respective disconnection signals so that the respective microcontrollers $20j$ are correspondingly disconnected from the data bus 100 by means of the associated switching units $120j$.

It is apparent that, instead of the disconnection signals, it is also possible to conclude that the associated microcontroller $20j$ is to be disconnected from the data bus 100 from the absence of a request signal for a respective drive controller $10j$. Thus, for example in principle all the microcontrollers 20 can be disconnected from the data bus 100 by the switching units 120, and the associated microcontroller $20i$ is connected to the data bus 100 by means of the switching unit $120i$ only when there is a positive (or negative) request signal for one of the drive controllers $10i$.

The field bus 30 is preferably a CAN bus, and the data bus 100 is preferably a serial RS232 data bus.

Using the field bus 30 in conjunction with the respective control unit $110i$ it is preferably possible to place the microcontroller $20i$ in a boot strap mode for programming.

The invention claimed is:

1. A data processing structure comprising a plurality of processors controlled by a field bus, a data bus for data communication with a serial data structure, the plurality of processors are connected in parallel to both the field bus and the data bus, wherein, for data communication with one of the plurality of processors via the data bus, the one processor is connected to the data bus, while all the others of the plurality of processors are disconnected from the data bus.

2. A data processing structure according to claim 1, wherein the plurality of processors are connected to the data bus in a parallel connection, and data communication via the data bus with the one of the plurality of processors for programming the one processor is permitted for and prohibited for all the others of the plurality of processors.

3. The data processing structure according to claim 2, wherein, for the data communication via the data bus the one processor is connected to the data bus, while all the others of the plurality of processors are disconnected from the data bus.

4. The data processing structure according to claim 1, wherein, in each case, one switching unit is connected between each processor and the data bus, wherein the switching unit is either connecting a processor to the data bus or disconnecting it from the data bus.

5. The data processing structure according to claim 4, wherein the plurality of processors are controlled via a field bus in a parallel connection.

6. The data processing structure according to claim 5, wherein each processor is assigned in each case one control unit, the control units are connected to the field bus, and the control units can receive control signals via the field bus in order either to connect the respective processors to the data bus via the associated switching units, or to disconnect them from the data bus.

7. A drive controller, preferably for a robot, having a data processing structure according to claim 1.

* * * * *